United States Patent [19]

Huntsman

[11] Patent Number: 4,884,130

[45] Date of Patent: Nov. 28, 1989

[54] METHOD OF DESCRIBING A COLOR IN A TRIAXIAL PLANAR VECTOR COLOR SPACE

[75] Inventor: James R. Huntsman, Stillwater, Minn.

[73] Assignee: Minnesota Mining and Manufacturing Company, St. Paul, Minn.

[21] Appl. No.: 187,831

[22] Filed: Apr. 29, 1988

[51] Int. Cl.⁴ .......................... G03F 3/08; H04N 1/16

[52] U.S. Cl. .......................................... 358/80; 358/75

[58] Field of Search .................................... 358/80, 75

[56] References Cited

U.S. PATENT DOCUMENTS

| | | | |
|---|---|---|---|
| 4,060,829 | 11/1977 | Sakamoto | 358/80 |
| 4,314,274 | 2/1982 | Atoji et al. | 358/80 |
| 4,335,398 | 6/1982 | Yamada | 358/80 |
| 4,386,267 | 5/1983 | Yamada | 358/80 X |
| 4,402,007 | 8/1983 | Yamada | 358/80 X |
| 4,409,614 | 10/1983 | Eichler et al. | 358/80 X |
| 4,623,973 | 11/1986 | Hoffrichter et al. | 364/526 |
| 4,626,903 | 12/1986 | Giesche et al. | 358/80 |
| 4,656,505 | 4/1987 | Yamada et al. | 358/80 |
| 4,670,780 | 6/1987 | McManus et al. | 358/80 |
| 4,707,727 | 11/1987 | Penney | 358/80 X |

OTHER PUBLICATIONS

"Vector Model for Normal and Dichromatic Color Vision", S. Lee Guth et al., J. Opt. Soc. Am., vol. 70, No. 2, 1980, pp. 197-212.

"Orthogonal Combination of the Three Visual Channels", Carl R. Ingling, Jr., et al., Vis. Rsch., vol. 17, pp. 1075-1082, 1977.

"Heterochromatic Additivity, Foveal Spectral Sensitivity, and a New Color Model", Sherman L. Guth et al., J. Opt. Soc. Am., vol. 63, No. 4, Apr. 1975, pp. 450-462.

"A Model of Colour Vision for Predicting Colour Appearance", R. W. G. Hunt, Color, Research and Application, vol. 7, No. 2, Part 1, Summer 1982.

"The GATF Color Diagrams ", F. L. Cox, GATF No. 6081, Research Project Report.

*Primary Examiner*—James J. Groody
*Assistant Examiner*—Mark R. Powell
*Attorney, Agent, or Firm*—Donald M. Sell; Walter N. Kirn; Mark A. Litman

[57] ABSTRACT

The present invention relates to a method of describing a color in a newly defined trigonal planar vector color space, said description utilizing an achromatic component and only two chromatic components. This method is useful for describing colors in a way which more closely relates to human color perception than other color spaces and is particularly useful for color reproduction by the photographic, printing, and electrophotographic processes.

18 Claims, 7 Drawing Sheets

METHOD OF DESCRIBING A COLOR IN A TRIAXIAL PLANAR VECTOR COLOR SPACE

BACKGROUND OF THE INVENTION

1. Field of the Invention

The present invention relates to a method for obtaining electronic information about a color image in a form that can be stored, transmitted, or used in electronic imaging or color reproduction.

2. Background of the Art

In the reproduction process of a color original by the halftone process, either offset, flexography, gravure, or any other printing process, each pixel element of the original is separated into amounts of colors comprising a primary set of colors, usually yellow, magenta, cyan, and black, each amount separately recorded electronically, or physically on a photosensitive medium such as photographic film in terms of density or area relative to the area of the pixel. This general process is well known and is described, for example, in *The Reproduction of Color,* chapters 10 and 11, by J. A. C. Yule and *The Reproduction of Colour in Photography, Printing, and Television,* 4th edition, chapters 25 and 28, by R. W. G. Hunt. The objective is not only that the reproduced color should perceptually match the original, but also that changes (corrections) in the original can be made to overcome defects or to alter the reproduction to a desired appearance different from the original.

Due to the requirement of making color separations, as well as historical photographic separation techniques, three filters with a bandpass generally the red, green, and blue regions of the visible spectrum are usually used to separate the original color element into amounts of yellow, magenta, and cyan. Mathematically, filters are optical integrators of their bandpass region. Typical filters might be equivalent to Wratten filter numbers 29, 47, and 61. However, no filter set exactly simulates human color vision so that reproductions will not be accurate and will, therefore, need to be corrected. Furthermore, the amount of achromatic component in a color element is usually correlated to the common amount of three filter densities, or to the density of a fourth filter which passes the visible spectrum.

If a quantitative means exists to describe the appearance of a pixel element, and the separation process and an algorithm to manipulate the separation process output can closely simulate visual appearance, then an accurate reproduction can be accomplished. Color spaces have been developed based on the trichromatic nature of human color vision as quantitative descriptions of a color. Such color spaces are, for example, CIE (Commission International de l'Eclairage) L*a*b*, L*u*v*, [C.I.E. Publication 15.2, 1986] and the 1931 CIE xyY system. Others include the Adams chromatic-valence space (Wx, Wy, Wz), Hunter Lab space, CIE (Wyszecki) U*V*W* system, MacAdam line element space, the Richter LABNHU space, and the FMC-I and FMC-II spaces. Virtually all color spaces include mathematical manipulations of the CIE tristimulus values X, Y, and Z, which supposedly represent the human trichromatic response to a perceived color. The tristimulus values are usually derived as a numerical summation at discrete wavelengths across the visible spectrum incorporating the color's reflectance or transmittance characteristics, the illuminating source's emission characteristics, and the human visual response through a response function such as the CIE standard observer color matching functions. Pyschophysically, the tristimulus values represent the continuous optical integration performed by the human visual system.

One means of overcoming some of the deficiencies of color reproduction as previously discussed is to have a gamut of known colors quantified in terms of input and output parameters of the color separation process to be used. The parameters of an original color element from the separation process can then be compared to a directory of parameter values of known colors in a memory, and the amounts of the reproduction primary colors to be used determined. Where the separation parameters do not match the directory's values close enough, an interpolation can be made if the separation parameters are within the gamut of the known colors. Such a method of color reproduction is sometimes referred to as color or hue recognition and, example, is the subject of U.S. Pat. Nos. 4,626,903, 4,623,973, 4,717,954, and 4,670,780, and the citations therein. As with the color spaces cited earlier, U.S. Pat. No. 4,623,973 also relies on an orthogonal coordinate system for the measured values ("R, G, B") of the pixel elements of a scanned color surface as well as the derived chrominance/luminance color space coordinates. U.S. Pat. No. 4,656,505 also utilizes a distinct achromatic, or neutral signal, but like other methods represents, in essence, second order masking corrections after the work of Yule, supra.

SUMMARY OF THE INVENTION

It is one aspect of the invention to specify a method to quantitatively describe a color in terms of an achromatic component and two or more chromatic components by way of a non-orthogonal color space. Most color spaces, particularly the CIE systems, describe color with a psychometric variable corresponding to lightness. However, the psychometric value of lightness, L*, in CIELAB and CIELUV comprises both achromatic and chromatic contributions, which is an inherent weakness for application to the color printing process. In the present invention, lightness is a dependent, not an independent metric. Also, while nearly all other color spaces are based on empirical correlations to perceived colors, the present invention is derived from a psychophysical vision model. In order to understand the basis of the invention, it is necessary to understand its psychophysical model.

The model for the invention is based on a planar arrangement of three, mutually opposed, basis vectors, each vector representing one of three visual (trichromatic) responses whose magnitude may be correlated with a CIE tristimulus value or a mathematical transformation (e.g., logarithm) of it, or another visual response value. Vector models to describe color vision are not new, as for example, those by Guth and Lodge (2) S. L. Guth, H. R. Lodge, "Heterochromatic Additivity, Foveal Spectral Sensitivity, and a New Color Model", J. Opt. Soc. Am., Vol. 63, No. 4, pp. 450–462 (April 1973); Guth et al. (3), S. L. Guth, R. W. Massof, T. Benzschawel, "Vector Model for Normal and Dichromatic Color Vision", ibid., Vol. 70, No. 2, pp. 197–212 (Feb. 1980).and Ingling and Tsou; (4). C. R. Ingling, Jr., B. H. Tsou, "Orthogonal Combination of Three Visual Channels", Vision Res., Vol. 17, pp. 1075–1082 (1977). However, these and other models are based on an orthogonal coordinate system. They also utilize the zone theory of vision in which separate chromatic (hue, chroma) and "luminance" components are used. One representation of the model as described in this invention is shown in FIG. 1, where its non-orthogonal vector arrangement is apparent. Although resembling a Maxwell color triangle; [5] J. C. Maxwell, "The Diagram of Colors", Trans. Royal Soc. Edinburgh, 21, pp. 275–298 (1857). or the GATF color hexagon and triangle; [6], F. L. Cox, "The GATF Color Diagrams", Research Proj. Rep. #6081, Graphic Arts Technical Foundation, Inc., Pittsburgh, Pa., referencing Rep. #6053, Sept. 1961, the model utilizes this geometry in a different way.

From this embodiment of the model, the "output" or resultant vector from three non-identical, ordinate (e.g., tristimulus) values is a vector describable also by amounts of only two of the three basis vectors. Taking the X basis vector of FIG. 1 as an angular reference point, the magnitude of the resultant vector may correspond to chroma, and the angle between the X vector and the resultant vector may correspond to hue. One effect of the vector arrangement of FIG. 1 is to subtract the smallest value from all three values so that the arrangement in FIG. 1 can be considered as a vector means of sorting out the minimum of three values. From standard principles of vector geometry, it can be seen that the effect of the vector addition of the smallest value, if non-zero, to a first vector resulting from the vector addition of the two larger values is to reduce the magnitude (chroma) of the first vector, and to change its direction (hue) unless the first vector is 180 degrees ("opposite") from the smallest value's axis.

It is generally considered that if the tristimulus values are equal, or nearly so, under normal (white-like illumination) viewing conditions, the perception is essentially achromatic. Similarly, if the product of the color's reflectance and the illuminating source's power distribution is essentially constant throughout the visible spectrum, the perception will be achromatic ("white", "gray", "black"). Therefore, in this invention, similar to some other models, the achromatic component of a color will be represented by tristimulus values equal to the minimum tristimulus value of the color. However, the invention's treatment of the chromatic component in terms of essentially planar vectors in non-orthogonal coordinates is unique.

For the embodiment of FIG. 1, the magnitude of the chroma vector C, |C|, and its direction $\theta$ (hue) can be calculated by equations (1) and (2) from standard vector geometry principles.

$$|C|^2 = X^2 + Y^2 + Z^2 - XY - XZ - YZ \quad (1)$$

$$\cos\theta = \frac{X \cdot C}{|X|\ |C|} \quad (2)$$

An alternative to equations (1) and (2) is to transform the coordinates of the point defining the resultant vector in the invention's planar trigonal coordinate system to coordinates in a rectangular coordinate system having the same origin. Since $\theta$ is relative to a reference point, the appropriate reference point should be retained to reduce confusion.

Although absolute scaling of the X, Y, and Z axes would be necessary for an absolute representation of colors, such absolute scaling is too difficult to determine accurately. However, since some aspects of color perception, notably hue, correlate with the proportions of X, Y, and Z, absolute scaling of the X, Y, and Z axes can be obviated by using proportionalized axes. If W represents the smallest value of a set of tristimulus values, then the proportioned variables x'', y'', and z'', as defined by equation (3), will correlate with hue. FIG. 2 is the result of the application of (3) to the CIE 10 degree Standard Observer color-matching functions.

$$x'' = \frac{x'}{x' + y' + z'}\ \ y'' = \frac{y'}{x' + y' + z'}\ \ z'' = \frac{z'}{x' + y' + z'} \quad (3)$$

where $x' = (X - W)$, $y' = (Y - W)$, and $z' = (Z - W)$

However, instead of using chroma as a general perceptual correlate as CIELAB and CIELUV do, another of the invention's principal perceptual correlates is purity. Conceptually, this is the mixing of the achromatic and chromatic components. Purity, P, according to the invention, is best given by equation (4) where |C| is from (1) and W is the smallest value of X, Y, and Z. The coefficients of |C| and W may be varied, even as non-integers, to achieve the best overall visual spacing.

$$P = \frac{|C|}{|C| + 3W} \quad (4)$$

One improvement the invention provides is that its color space representation of colors is more uniform and consistent with the principles of additivity of complementary colors as practiced in color science, more specifically in color photography, and much more specifically in color halftone printing. To illustrate this improvement for purposes of halftone printing, the color space representations of ideal primary printing colors of yellow (Y), magenta (M), cyan (C), and their corresponding ideal secondary colors red (R), green (G), and blue (B) as a calculated function of dot area in 10% intervals for CIELAB, CIELUV, and the present invention are shown in FIGS. 3, 4, and 5, respectively. FIG. 3 is the a*b* representation of CIELAB and shows both curvature and nonuniformity for all the colors' dot area scales. This is not unexpected since the CIELAB system is a non-linear transformation of the tristimulus values. FIG. 4 is the u*v* representation of CIELUV and shows an improvement over FIG. 3 in that each color's scale is not curved, and the complementary colors are opposite (180 degrees apart). However, the spacings (intervals) of complementary colors are not uniform for all colors, especially red and cyan. FIG. 5 is the invention's representation of these color scales. This representation is an improvement over both CIELAB and CIELUV in that each color scale is a uniformly spaced straight line, and all complementary colors are 180 degrees apart, with equal intervals. Although the CIELAB and CIELUV systems were developed for the principal purpose of color difference measurements, they are also used (inappropriately) for color appearance representations since there are no better accepted systems.

The invention's representation as purity of Munsell colors of Value=7, rotated by 60 degrees so that yellow is "up" (FIG. 6) doesn't seem much different from that of CIELAB (FIG. 7) and CIELUV (FIG. 8). However, when trying to represent the German DIN color system defined by the CIE xyY system (FIG. 9), CIELAB (FIG. 10) and CIELUV (FIG. 11) fail badly; whereas, the invention's representation as purity (FIG. 12) is remarkably accurate.

Another important and useful improvement of the invention over present color spaces, even other than CIELAB and CIELUV, and CIE xyY is that the invention's geometry as in FIG. 1 accurately predicts the wavelengths of the psychologically unique hues of yellow, green, and blue, as indicated in FIG. 2 at Θ60° (573 nm), 120° (516 nm), and 240° (471 nm). The invention shows that there is no monochromatic unique red (Θ0°), which is instead given by its complementary wavelength (492 nm). To the best of the inventor's knowledge, no color vision model and corresponding spatial representation now exists which so accurately predicts all the visually unique hues, even the conal sensitivity models.

In color printing, CIELAB (FIG. 13) and CIELUV (FIG. 14) do not represent the color perception of the ink dot-area color scales of Y, M, C, R, G, and B, most notably for the highest dot areas of blue (B), as indicated by a hooking, or "J" shape. However, the invention's purity representation of these scales (FIG. 15) much more accurately corresponds to their visual perception.

Another important and useful improvement of the invention over present color spaces, especially as regards color reproduction via the printing process, is its quantification and use of an achromatic component as opposed to only a lightness component such as L* in CIELAB and CIELUV or Y in the CIE xyY system. The variation of L* and the invention's achromatic component W (for "white") with percent dot area of ideal colors is shown in FIG. 16 and 17, respectively. While the invention can also utilize L* as a measure of lightness or "intensity", such lightness or "intensity" may also be correlated with $|C|$ and W, since L* can comprise them.

It is seen in FIG. 16 that the variation of L* is curved, not linear with percent dot area. Moreover, L* incorporates both achromatic and chromatic contributions so that the value of L* cannot be linearly related to percent dot area of any primary color or black used in the printing process. However, in FIG. 17, it is seen that that the achromatic component W varies linearly and uniformly with percent dot area. This characteristic is useful in at least two aspects with regard to the printing process. First, the value of W can be made to correspond to the dot area of the black printer since it will not affect hue if the black ink is neutral. This is particularly advantageous for the halftone color separation processs in general, and in particular the gray component replacement (GCR) process because in the GCR process, any color is supposedly reproduceable with only two primary colors to produce hue and chroma, and black to control lightness and chroma. This invention inherently produces results which allow color reproduction in terms of amounts of two primary chromatic colors and achromatic component. Secondly, the linearity of FIG. 17 is useful to color scanners since they nearly always utilize linear or monotonic tone reproduction scales. Such linearity also makes color correction easier and more accurate. The invention's method provides a linear relationship between its chroma C and its achromatic component W (FIG. 18). It thus becomes straightforward to determine the effect on C of changing the amount of W, and vice-versa.

Since the invention relates to a method for the reproduction of the appearance of a color or color pixel, its accuracy will depend on the accuracy of the tristimulus values of the color pixel. However, in the color separation process via electronic scanning, it is difficult to obtain a highly resolved reflectance or transmittance spectrum throughout the visible spectrum, although such a spectrum might be obtainable through Fourier transform spectroscopy or through the use of wavelength dispersion process and an array detector. Instead, the reflectance or transmittance characteristics of the color pixel are usually determined from a set of filters, which together can span the visible spectrum but individually correspond to the red, green, and blue regions of the spectrum such as the Wratten filters mentioned previously. A principal undesirable characteristic of such filters is that they do not correspond to the human visual response. However, in colorimetry, there are filters which closely approximate the standard observer functions of the CIE, and the use of these filters would enhance the accuracy of a color reproduction by the method of the invention over the use of Wratten or narrow band filters.

DETAILED DESCRIPTION OF THE INVENTION

Figure 1:
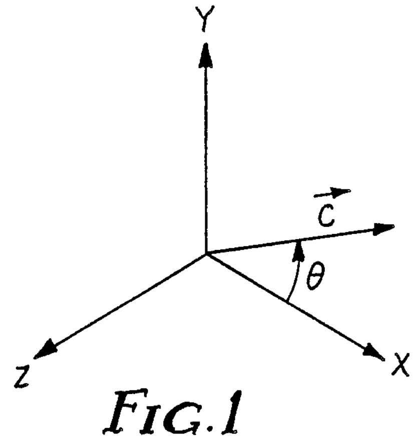
FIGS. 1 and 2 are representations of the three axes needed to provide a graphic representation of a color.
Figure 2:
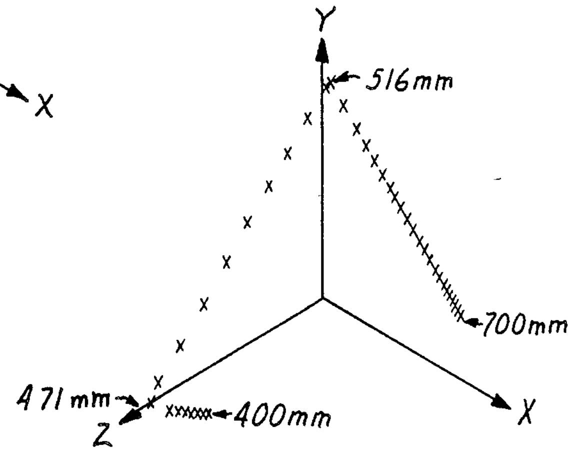
Figure 3:
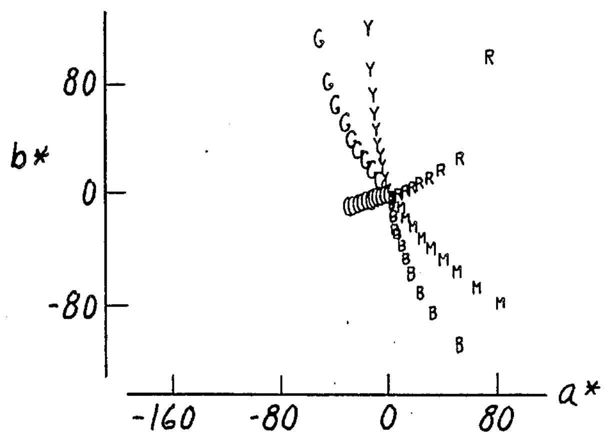
FIGS. 3, 4 and 5 are color space representations of yellow, magenta and cyan, and their corresponding ideal secondary colors, red, green and blue as a calculated function of CIELAB, CIELUV and the present invention, respectively.
Figure 4:
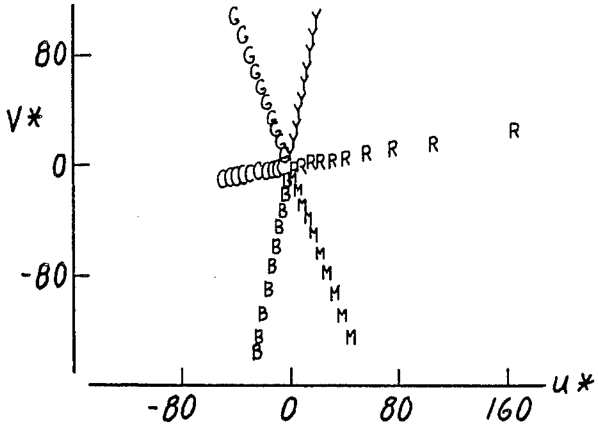
Figure 5:
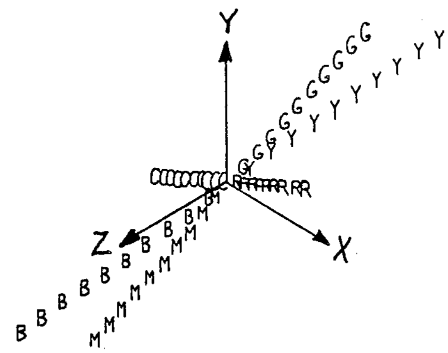
Figure 6:
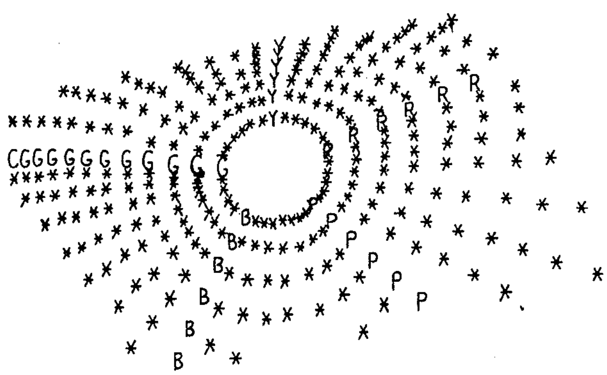
FIGS. 6, 7 and 8 are color space representations of Minsell colors of the invention, CIELAB and CIELUV, respectively.

The present invention relates to a method of representing a color with vectors in a triaxial, essentially planar vector color space comprising the steps of: (a) illuminating a surface with light having sufficiently appropriate composition and intensity throughout the visible region of the electromagnetic spectrum; or (b) receiving an intensity of light from a self-luminous object, (c) measuring said intensities, (d) transforming said intensities into electronic data representing at least three visual responses corresponding generally to the red, green and blue parts of the spectrum, and into chromatic and achromatic data resulting from the vector geometry of the invention, (e) converting said electronic data into achromatic data as the lowest value of said electronic data, and (f) storing, transmitting, or outputting said chromatic and achromatic data. The measuring of intensity may be performed by commercially available opto-electronic sensors which are stimulated by radiation to generate electronic signals. Intensities from a surface may be transmitted through said surface or reflected from said surface. The hue and chroma data may be derived from a vector represented by ordinate values and an angle component in relationship to the ordinate axis, the magnitude of said vector determining chroma data and the angle component representing hue data. The chromatic and achromatic data may be used in many different ways. They may be stored for later use or transferred to any imaging system which uses electronic signals to determine or generate an image. This can be done with cathode ray tubes, laser imageable systems, e-beam imaging systems, and the like. For example, the electronic hue, chroma and achromatic information may be used to stimulate or activate an actinic laser emitter or array of such laser emitters. The laser or array may be used to generate a photographic image as on a printing plate, photoconductor, photopolymer, proofing, or other photosensitive type systems. The image may be generated for one color at a time, or for multiple colors at the same time, or individual sheets may be imaged to generate individual color images which can be associated (e.g., laminated if on transparent substrates, or transferred if on individual color layers to form a full color image. The usual laser imaging apparatus would comprise at least one, but usually several laser stimulated imaging units or arrays.

It would be especially useful in a color reproduction process where an original is opto-electronically scanned and subsequently represented by amounts from a set of colors, chromatic and/or achromatic, which, when appropriately combined, reasonably reproduce the original in terms of the psychophysical visual characteristics such as hue, purity, and lightness. The present invention also allows correction of the reproduction in a more linear means than present methods.

The invention comprises a method of representing a color according to the vector space geometry in a triaxial, essentially planar vector color space comprising the steps of:

(a) illuminating a surface with light, said light having a spectral composition and intensity generally throughout the visible region of the electromagnetic spectrum and receiving said light, or receiving light intensity from a self-luminous object, (b) converting the received intensity of said light from said surface or said object into electronic data representing at least three visual responses either optically with filters or electronically with a mathematical transformation related to wavelength, perception, and intensity.

(c) selecting the lowest value of said electronic data as achromatic data and converting said electronic data into chromatic data by letting each value of said electronic data be an ordinate value on a corresponding axis of a triaxial, essentially planar vector space and determining chroma as the magnitude and hue as the direction of the vector resulting from said vector space (d) determining the amounts of primary colors capable of representing said color by comparing said converted achromatic and chromatic data to similarly converted achromatic and chromatic data from known colors having known corresponding density, intensity, or area amounts relative to a pixel element in terms of said primary colors, and (e) storing, transmitting, or outputting said chromatic and achromatic data.

Figure 19:
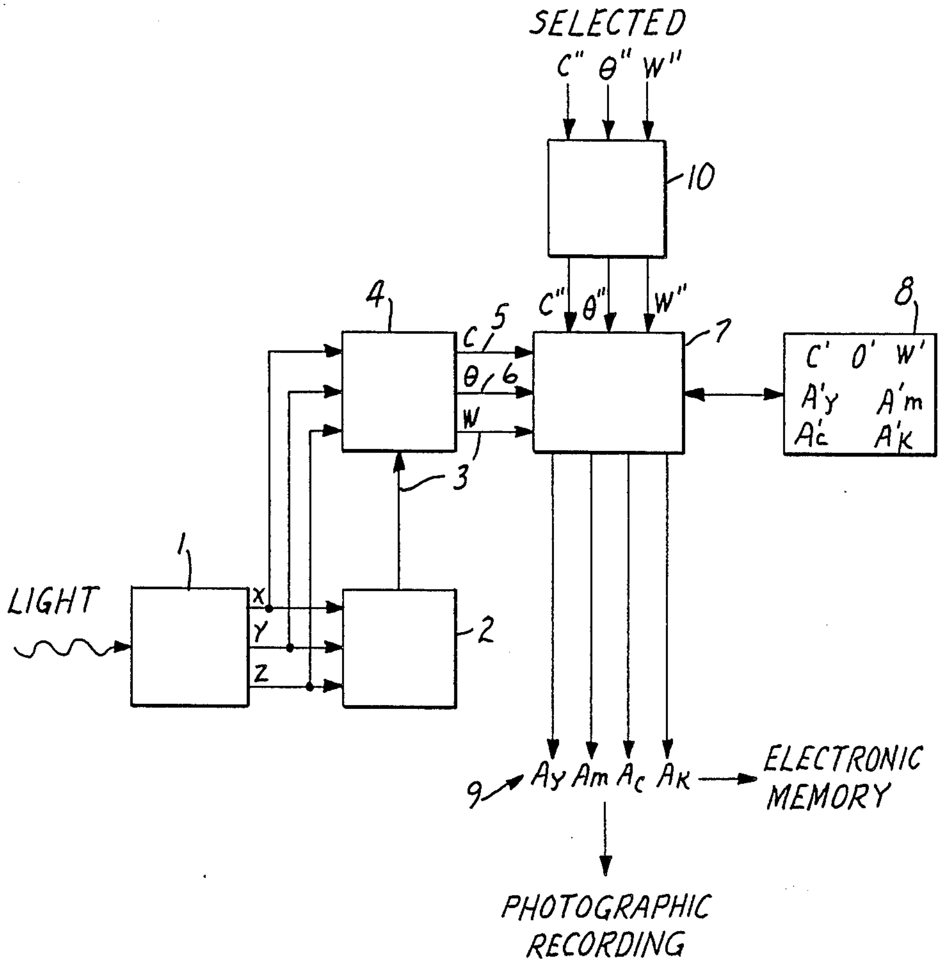
FIG. 19 is a schematic of the process of the present invention.

A detailed description of an embodiment of the invention, for example, in an electronic circuit in a color separation scanner follows in conjunction with a representation of it in FIG. 19. Three signals X, Y, and Z, representing approximations of tristimulus values of a color or color pixel from a color separation process 1, are inputted into computer operation 2, which determines and outputs the minimum tristimulus value W, 3. The X, Y, and Z signals are also inputted to computer operation 4 which determines the magnitude of their resultant vector, C, 5, and hue angle 6, according to equations (1) and (2), which are standard means from the principles of vector geometry. Computer operations 2 and 4 may be incorporated together.

The values of C, Θ, and W can then be input into computer operation 7, which compares them to values of C′, Θ′, and W′ stored in a memory 8 for known combinations of various relative percent areas or optical densities of the primary colors on a given paper-like base to be used in the reproduction process. The memory 8 also contains the values of the relative percent area or densities of each component comprising the combination having C′, Θ′ and W′. Since an exact match between C, Θ, and W, and C′, Θ′ and W′ is unlikely, an interval of acceptable difference should be incorporated into the comparison algorithm in 7 to determine the closest acceptable combination of C′, Θ′, and W′.

Alternatively, an algorithm may be utilized to determine (or interpolate) the relative percent areas or densities of the primary colors and base producing a C′, Θ′, and W′ most closely matching C, Θ, and W. Computer operation 7 should also contain an algorithm which determines whether C, Θ, and W are reproducible from the reference gamut of known color combinations and what should be done if C, Θ and/or W are beyond the reference gamut. One such response would be to produce 100% area, but such an area of a primary might likely be insufficient for an accurate reproduction.

One output of computer operation 7 can be signals 9, corresponding to the values of the relative percent areas of the primary colors Y, M, C, and K (black), shown as Ay, Am, and Ac, one of which will be 0 due to the method of the invention, and Ak. Signals Ay, Am, Ac, and Ak for their corresponding pixel may then be stored electronically and/or outputted onto a photosensitive medium such that there is a separate medium or separate areas on the medium for the recording of the Ay, Am, Ac, and Ak signals.

If the initial color reproduction by signals Ay, Am, Ac, and Ak is not acceptable, and these signals are stored in a memory, the reproduced color may be changed by the input of selected values of C″, Θ″, and W″ via computer operation 10 into computer operation 7. This sequence may be repeated until an acceptable color reproduction is obtained in one or more pixels as desired.

Figure 7:
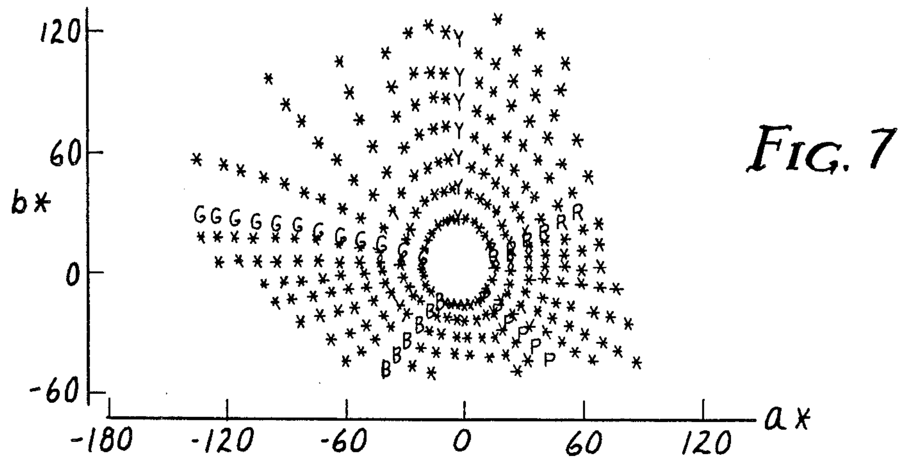
Figure 8:
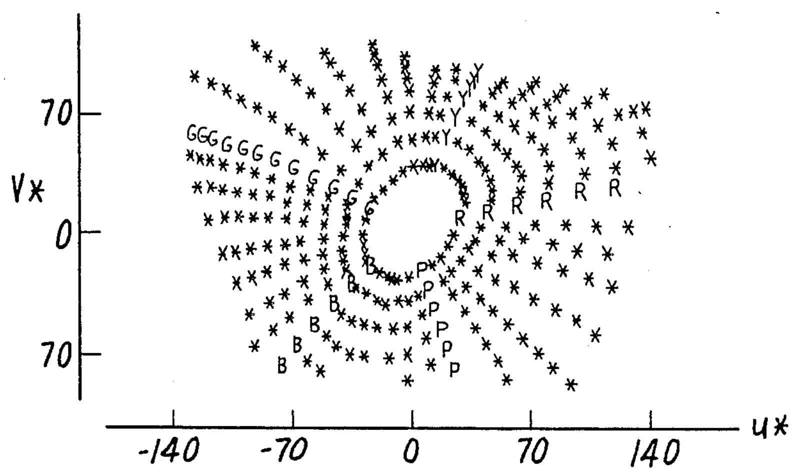
Figure 9:
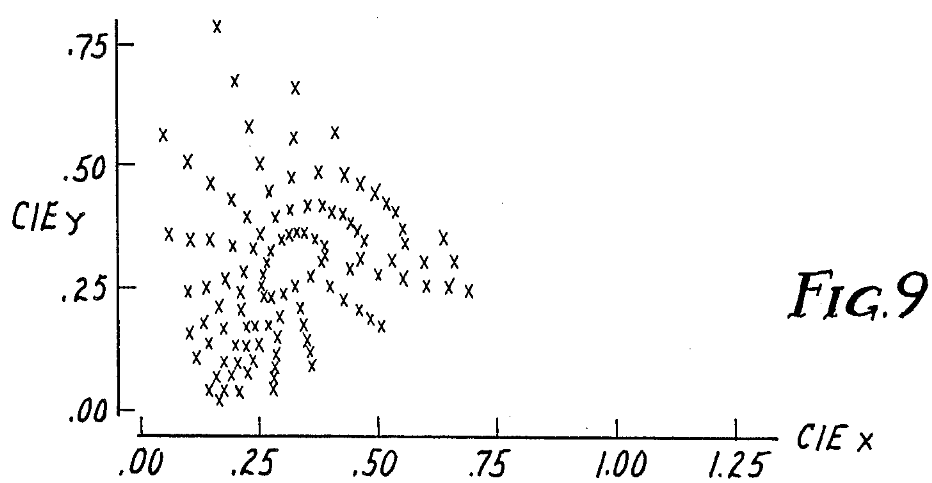
FIGS. 9, 10, 11 and 12 are color space representations of the DIN Color System as defined by CIE xyY, CIELAB, CIELUV, and the invention, respectively.
Figure 10:
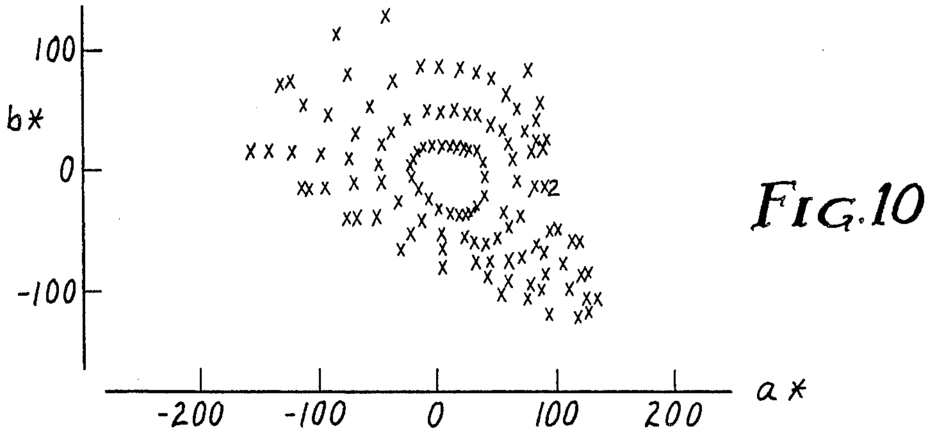
Figure 11:
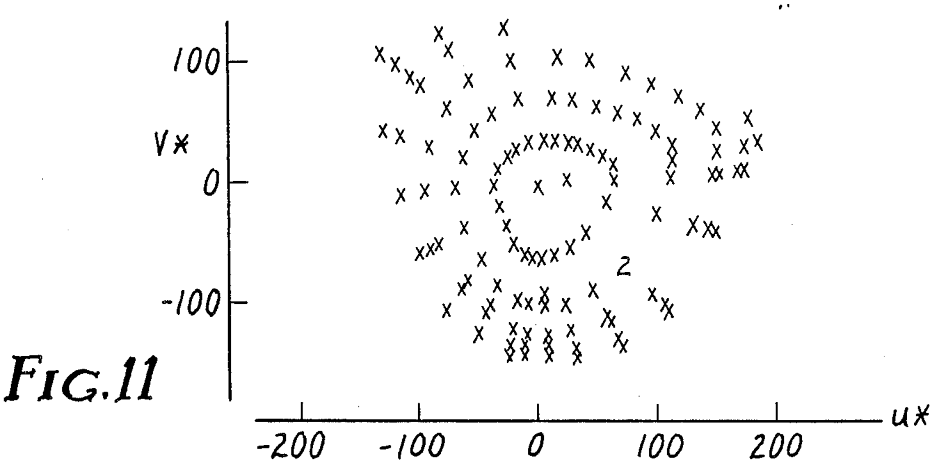
Figure 12:
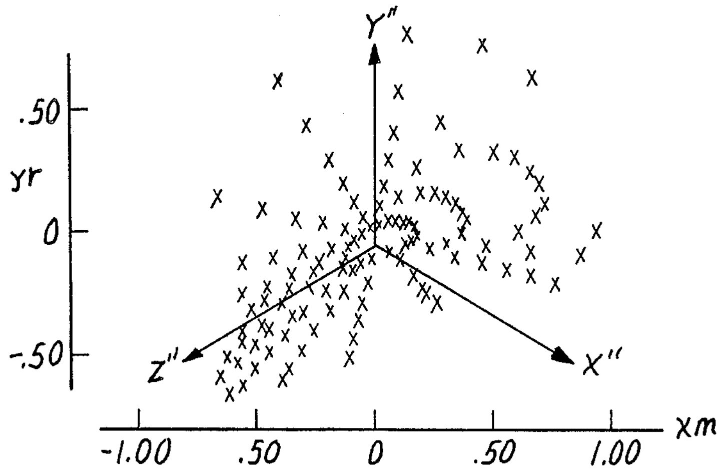
Figure 13:
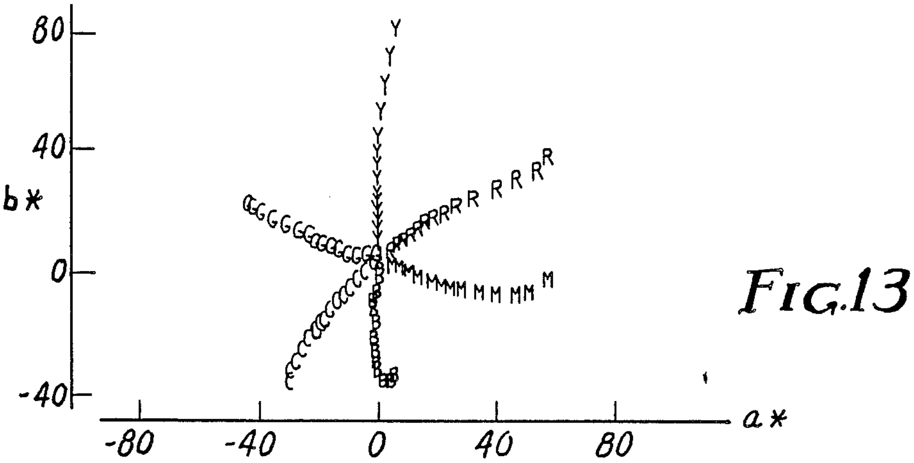
FIGS. 13, 14 and 15 are representations of dot area color scales in color printing for CIELAB, CIELUV, and the invention respectively.
Figure 14:
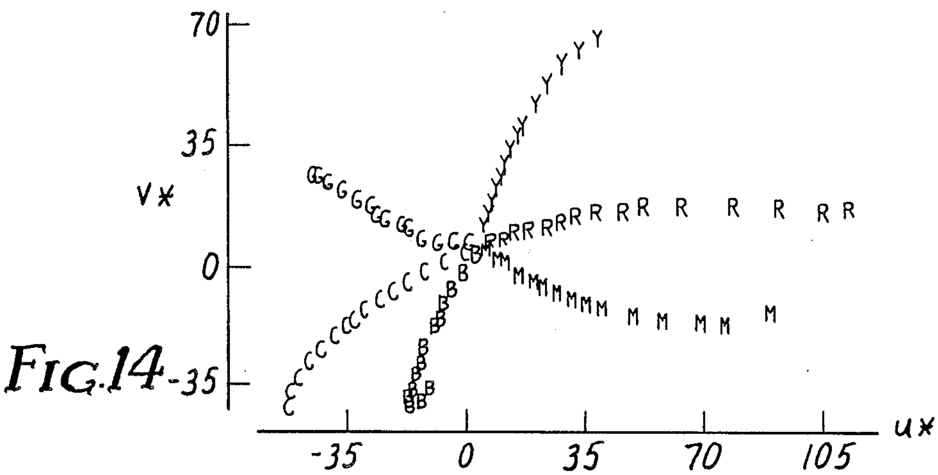
Figure 15:
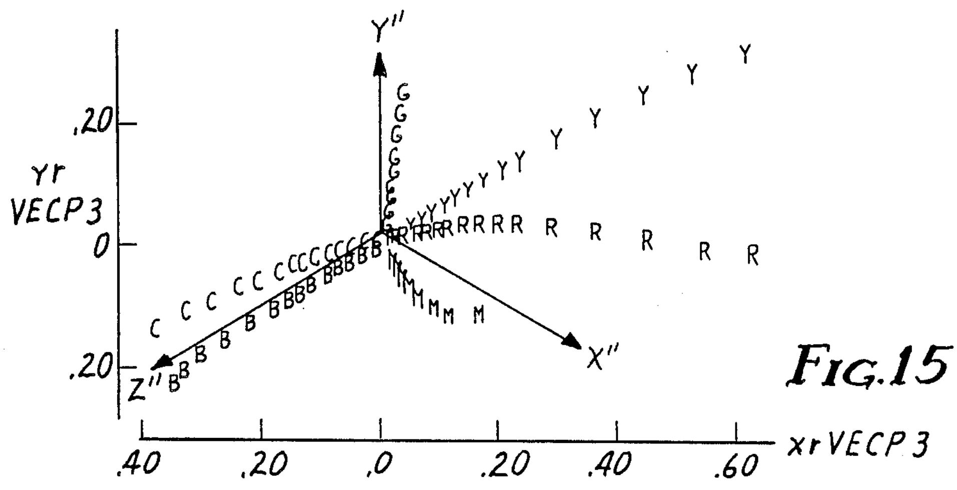
Figure 16:
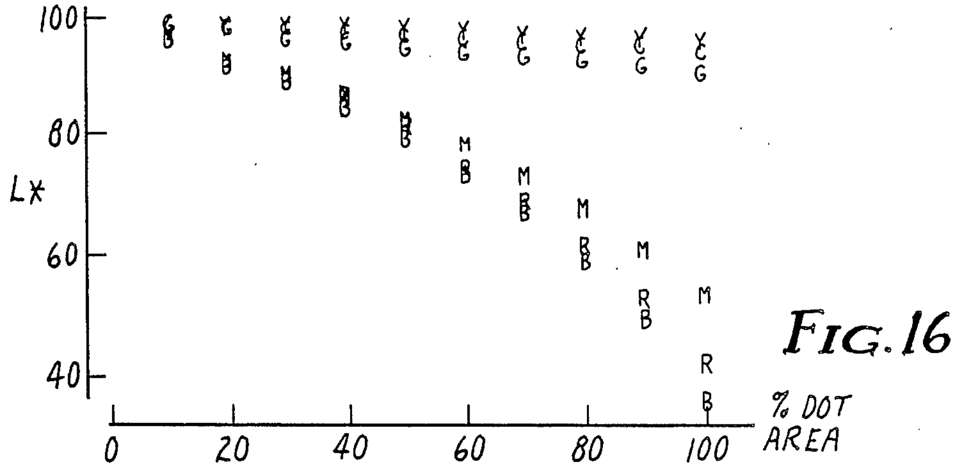
FIGS. 16 and 17 show the variation of L* and the achromatic component W with percent dot area of ideal colors.
Figure 17:
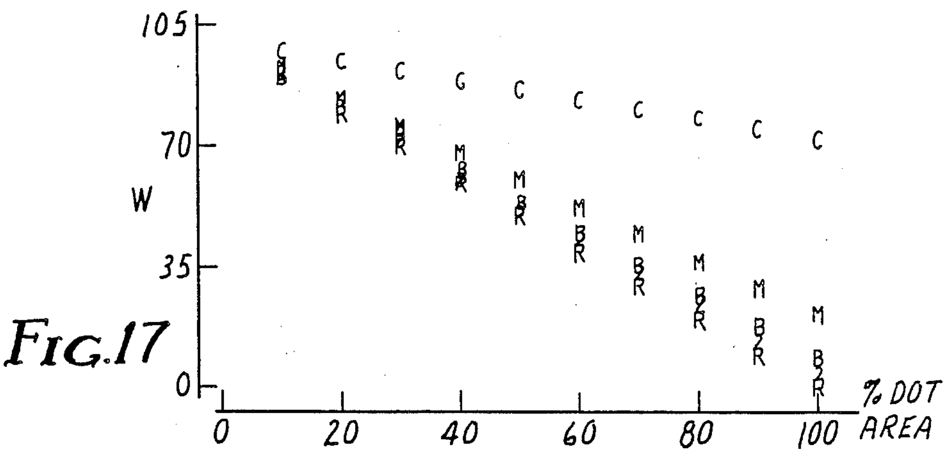
Figure 18:
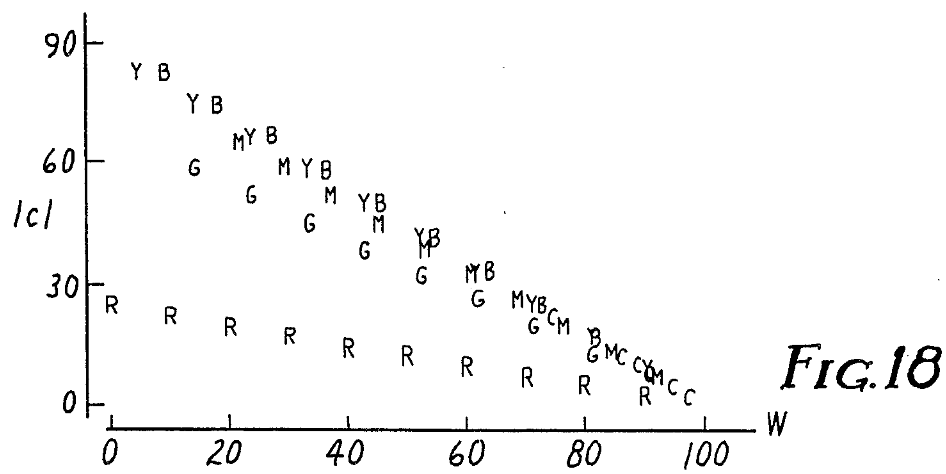
FIG. 18 shows the linear relationship between chroma (C) and the achromatic component (W).

Another distinct utility of the invention is that with it, the amount of data stored in memory 8 can be substantially reduced because as is presently done, memory 8 must contain values of C′, Θ′, and W′ for various combinations of black (K) with various combinations of Y and M, Y and C, and M and C; whereas, with the method of the invention, only values of C′, Θ′, and W′ for combinations of Y and M, Y and C, and M and C would be necessary because the amount of K can be determined from relationships as, for example, in FIG. 7 between chroma $|C|$, W, and Ak. For example, suppose that from the outputs of operations 1, 2, and 4, $C=20$, $\Theta=30$, and $W=40$. The first operation in 7 could be to search memory 8 for a combination having $C'=20$ and Θ' (hue)=30. Suppose the combination's W'=50. A W=40 is required to match so an amount Ak corresponding to a decrease of 10 in W must be used to make up the difference. W is decreased by adding blacks. However, if this amount of K is added to the amounts of Y and M producing Θ=30 and C,'=20, the chroma of the reproduced color will be less than 20 because the addition of K to the binary combination having C'=20 will decrease its chroma. It is desired to have the reproduced chroma=20 after black has been added to make W=40. Therefore, from such a relation (e.g., FIG. 18) a value of C*' greater than 20 is chosen to be matched from the memory in 8 so that when K is added to produce W=40, it will be added to a C' larger than 20. The amount of K added will be determined as the amount from relationships such as in FIGS. 17 and 18 for K, which, when added to C*', produces chroma=20 and W=40. As it is desirable for color control and economic reasons to use as little as possible of Y, M, and C inks, the value of C*' determined from FIG. 18 can be that which minimized the amounts of colored inks and maximizes the amount of black ink.

I claim:

1. A method of representing a color according to the vector space geometry in a triaxial, essentially planar vector color space comprising the steps of:

(a) illuminating a surface with light, said light having a spectral composition and intensity generally throughout the visible region of the electromagnetic spectrum, and receiving said light or receiving light intensity from a self-luminous object, (b) converting the received intensity of said light from said surface or said object into electronic data representing at least three visual responses either optically with filters or electronically with a mathematical transformation related to wavelength, intensity, and perception, (c) selecting the lowest value of said electronic data as achromatic data and converting said electronic data into chromatic data by letting each value of said electronic data be an ordinate value on a corresponding axis of a triaxial, essentially planar vector space and determining chroma as the magnitude and hue as the direction of the vector resulting from said vector space geometry of the ordinate values of said electronic data, (d) determining the amounts of primary colors capable of representing said color by comparing said converted achromatic and chromatic data to similarly converted achromatic and chromatic data from known colors having known corresponding density, intensity, or area amounts relative to a pixel element in terms of said primary colors, and (e) storing, transmitting, or outputting said chromatic and achromatic data, or said amounts of primary colors.

2. The method of claim 1 wherein said three vector axes are at angles of about 120°.

3. The method of claim 1 wherein said visual responses are CIE tristimulus values, or are values from visually derived, color-matching functions.

4. The method of claim 1 wherein said three vector axes are at angles of about 120° and said three visual response data are CIE tristimulus values.

5. The method of claim 1 wherein said primary colors are approximately yellow, magenta, cyan and black.

6. The method of claim 1 wherein said primary colors are approximately red, green, and blue.

7. The method of claim 4 wherein said primary colors are approximately yellow, magenta, cyan, and black.

8. The method of claim 5 wherein the intensity of said light from said surface is reflected or transmitted intensity.

9. The method of claim 6 wherein the intensity of said light from said surface is reflected or transmitted intensity.

10. The method of claim 7 wherein the intensity of said light from said surface are reflected or transmitted intensity.

11. The method of claim 1 wherein said hue, chroma, and achromatic data are transmitted to an imaging apparatus, either with or without first storage of said data and said data is used to activate at least one actinic radiation emitter in said apparatus to generate an image for the reproduction of a color.

12. The method of claim 9 wherein said hue, chroma, and achromatic data are transmitted to an imaging apparatus, either with or without first storage of said data and said data is used to activate at least one actinic radiation emitter in said apparatus to generate an image for the reproduction of a color.

13. The method of claim 10 wherein said hue, chroma, and achromatic data are transmitted to an imaging apparatus, either with or without first storage of said data and said data is used to activate at least one actinic radiation emitter in said apparatus to generate an image for the reproduction of a color.

14. The method of claim 11 wherein said hue, chroma and data are transmitted to an imaging apparatus, either with or without first storage of said data and said data is used to activate at least one actinic radiation emitter in said apparatus to generate an image for the reproduction of color.

15. The method of claim 6 wherein said amounts of said primary colors are transmitted to a self-luminous display device using said primary colors.

16. The method of claim 12 wherein said emitter is a laser.

17. The method of claim 13 wherein said emitter is a laser.

18. The method of claim 14 wherein said emitter is a laser.

* * * * *